US012390705B2

(12) United States Patent
Terry

(10) Patent No.: US 12,390,705 B2
(45) Date of Patent: Aug. 19, 2025

(54) MULTI-FUNCTIONAL GOLFING ATTACHMENT DEVICE

(71) Applicant: Craig Terry, Thousand Oaks, CA (US)

(72) Inventor: Craig Terry, Thousand Oaks, CA (US)

( * ) Notice: Subject to any disclaimer, the term of this patent is extended or adjusted under 35 U.S.C. 154(b) by 332 days.

(21) Appl. No.: 18/128,661

(22) Filed: Mar. 30, 2023

(65) Prior Publication Data

US 2024/0325835 A1 Oct. 3, 2024

(51) Int. Cl.

| | |
|---|---|
| ***A63B 57/20*** | (2015.01) |
| ***A63B 47/04*** | (2006.01) |
| ***A63B 57/50*** | (2015.01) |
| ***A63B 57/60*** | (2015.01) |
| ***B67B 7/16*** | (2006.01) |

(52) U.S. Cl.

CPC ............ *A63B 57/203* (2015.10); *A63B 57/50* (2015.10); *A63B 57/60* (2015.10); *B67B 7/16* (2013.01); *A63B 47/04* (2013.01)

(58) Field of Classification Search

CPC ....... A63B 57/203; A63B 57/50; A63B 57/60; A63B 47/04; B67B 7/16

See application file for complete search history.

(56) References Cited

U.S. PATENT DOCUMENTS

| | | | | |
|---|---|---|---|---|
| 6,095,934 | A | 8/2000 | Ohama | |
| 6,220,973 | B1 | 4/2001 | Hsu | |
| 6,808,095 | B2 * | 10/2004 | Hurtgam | A63B 57/207 473/405 |
| D514,647 | S * | 2/2006 | Mora | D21/796 |
| D516,153 | S | 2/2006 | Cheng | |
| 7,100,230 | B2 | 9/2006 | Hillenbrand | |
| 8,231,483 | B2 * | 7/2012 | Gill | A63B 57/353 473/408 |
| 8,454,457 | B1 * | 6/2013 | Woods | A63B 57/353 15/106 |
| 8,616,994 | B2 | 12/2013 | Kwon | |
| D775,701 | S * | 1/2017 | Hinshaw | D21/793 |
| 11,413,511 | B1 | 8/2022 | Lee | |
| 11,547,911 | B2 * | 1/2023 | Krauter | A63B 57/207 |
| 11,673,032 | B2 * | 6/2023 | Galacz | A63B 57/203 473/406 |
| 2008/0109976 | A1 | 5/2008 | Sanabia | |
| 2009/0209369 | A1 * | 8/2009 | Smith | A63B 57/10 224/183 |

FOREIGN PATENT DOCUMENTS

| | | |
|---|---|---|
| GB | 2353955 | 3/2001 |

* cited by examiner

*Primary Examiner* — David B. Thomas

(57) ABSTRACT

A multi-functional golfing attachment device for opening bottles and repairing divots includes a base plate having a pair of channels extending therethrough. Each of the channels receives a respective golf tee of a pair of golfing tees. A plurality of bristles is coupled to the base plate and facilitates cleaning golf related articles. A fastening member is coupled to the base plate and fastens to an object positioned proximate to a golfer. A divot repairing tool is coupled to the base plate. A bottle cap remover is coupled to the base plate and facilitates removing a cap from a bottle.

8 Claims, 5 Drawing Sheets

MULTI-FUNCTIONAL GOLFING ATTACHMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to golf tee holders and more particularly pertains to a new golf tee holder for opening bottles and repairing divots.

(2) Description of Related Art Including Information Disclosed Under 37 CFR 1.97 and 1.98

The prior art relates to golf tee holders and includes a variety of golf tee holders having a brush configured for cleaning golf related accessories. Known prior art does not include a golf tee holder having a divot repairing tool and a bottle opener.

BRIEF SUMMARY OF THE INVENTION

An embodiment of the disclosure meets the needs presented above by generally comprising a base plate having a pair of channels extending therethrough. Each of the channels is configured to receive a respective golf tee of a pair of golfing tees. A plurality of bristles is coupled to the base plate and is configured for facilitating cleaning golf related articles. A fastening member is coupled to the base plate and is configured for removably fastening to an object positioned proximate to a golfer. A divot repairing tool is coupled to the base plate. A bottle cap remover is coupled to the base plate and is configured to facilitate removing a cap from a bottle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
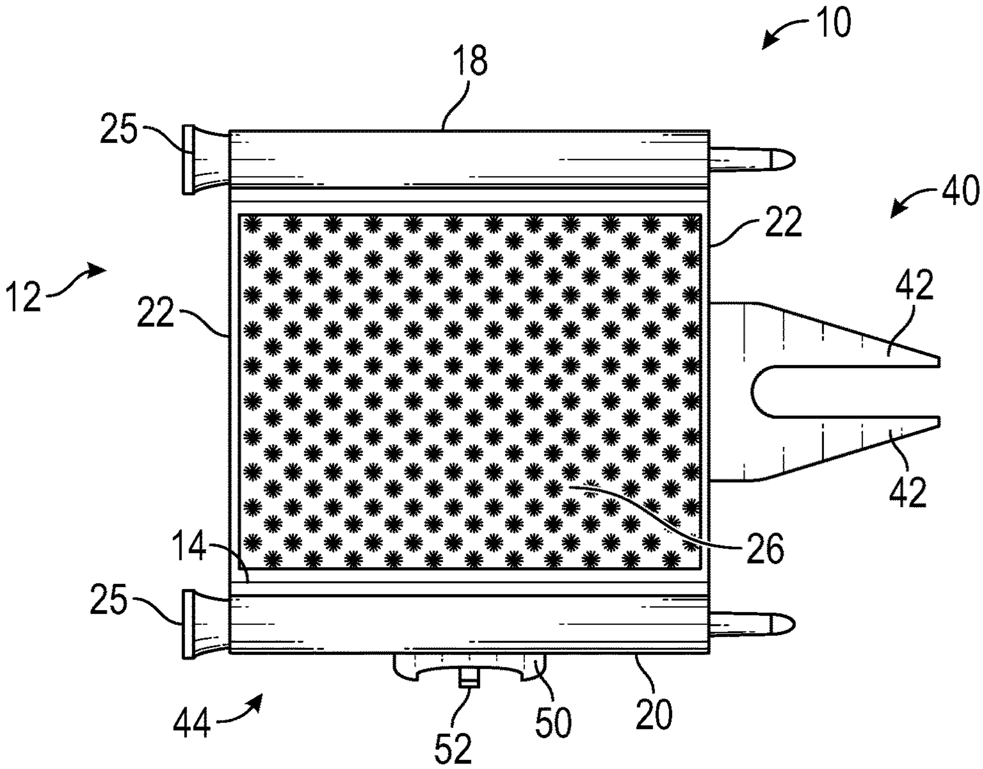
FIG. 1 is a front view of a multi-functional golfing attachment device according to an embodiment of the disclosure.
Figure 2:
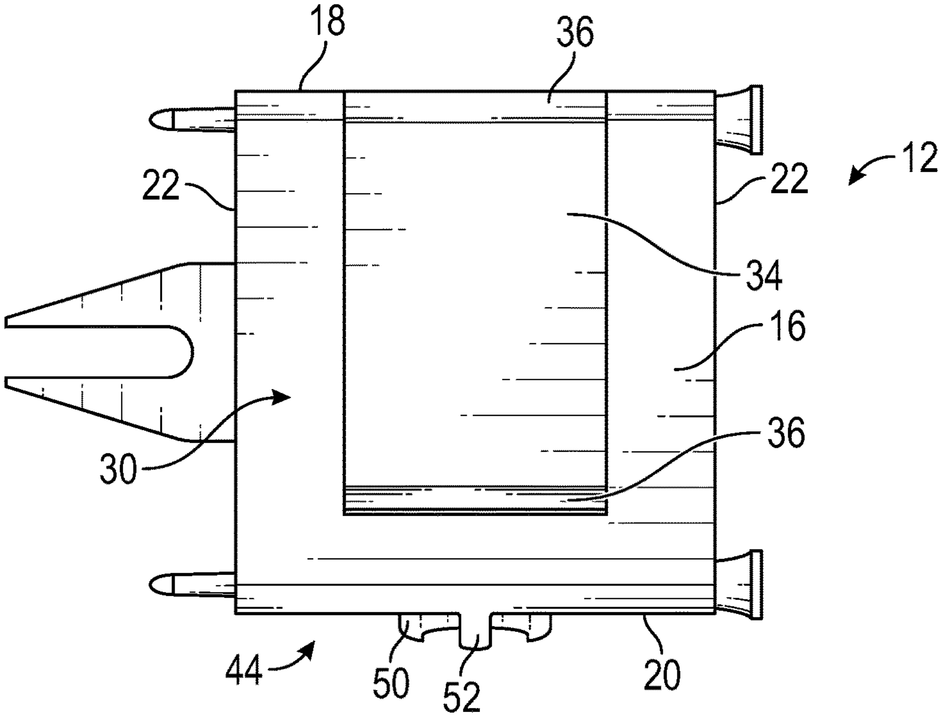
FIG. 2 is a rear view of an embodiment of the disclosure.
Figure 3:
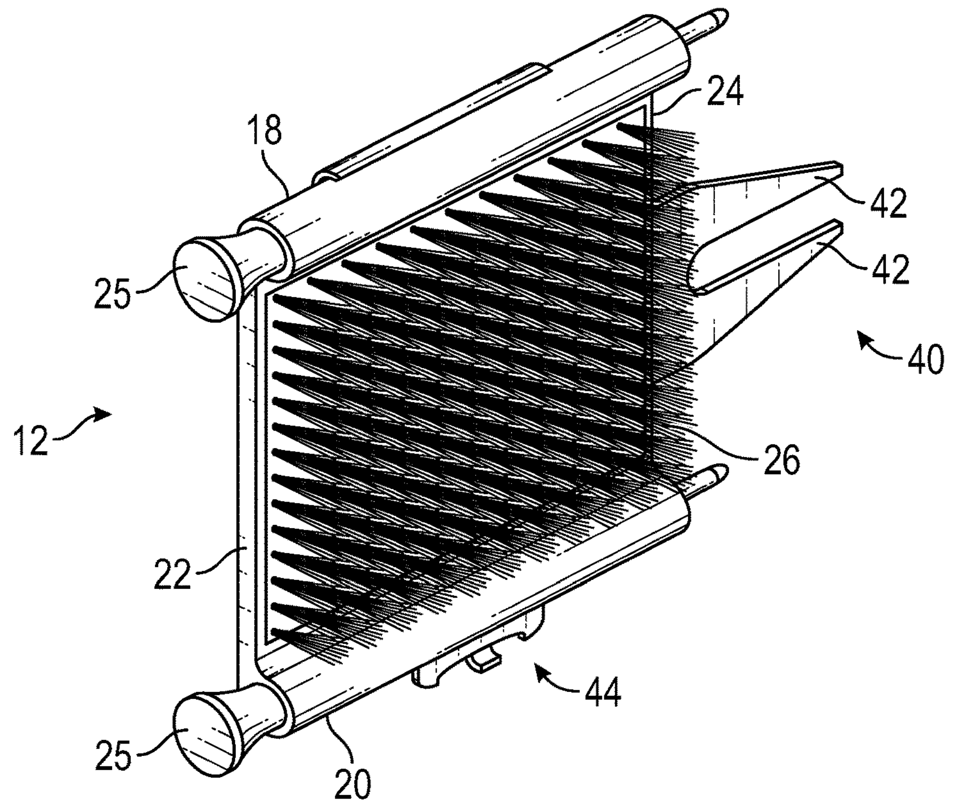
FIG. 3 is a top isometric view of an embodiment of the disclosure.
Figure 4:
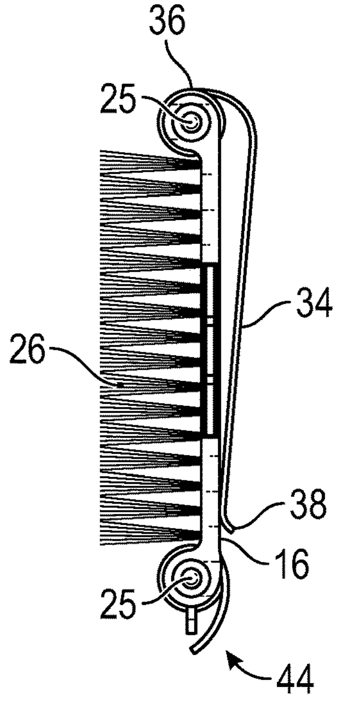
FIG. 4 is a right-side view of an embodiment of the disclosure.
Figure 5:
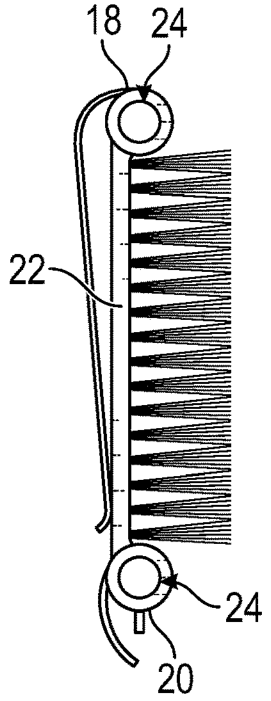
FIG. 5 is a left-side view of an embodiment of the disclosure.
Figure 6:
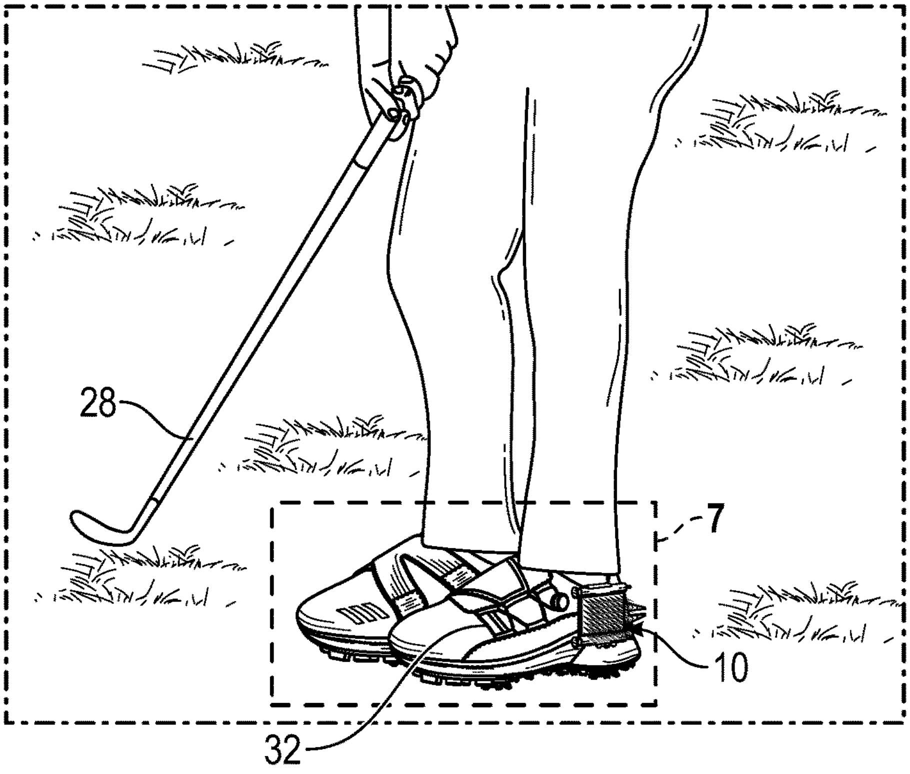
FIG. 6 is an in-use view of an embodiment of the disclosure.
Figure 7:
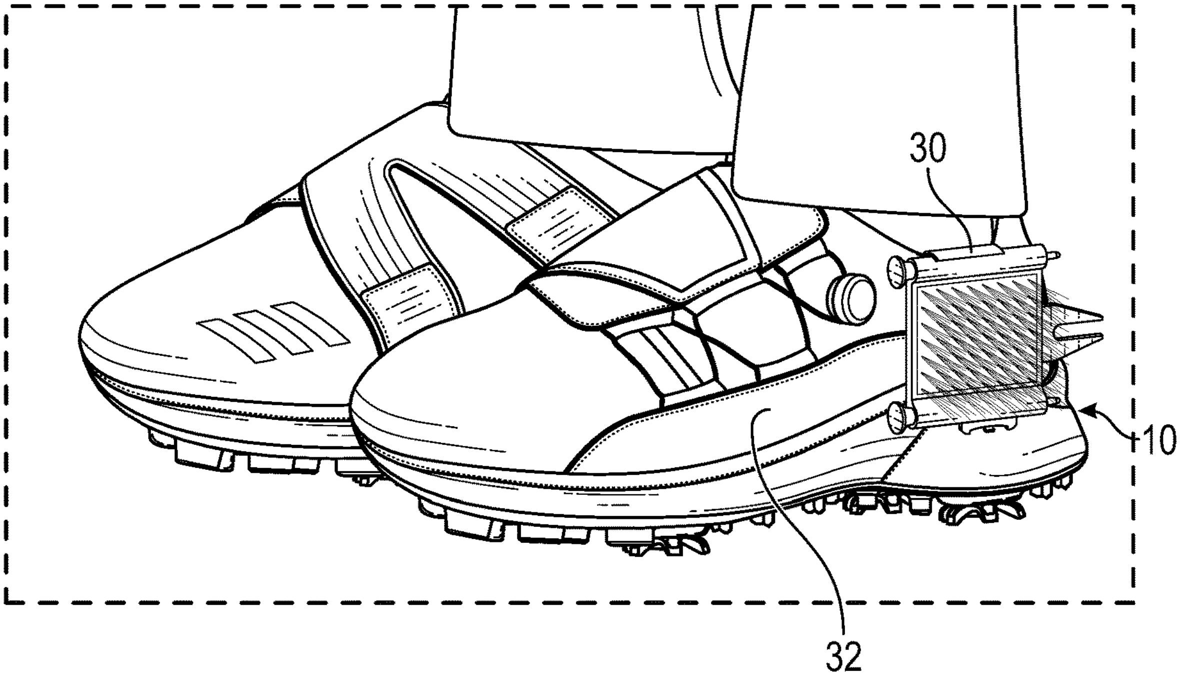
FIG. 7 is a detailed in-use view of an embodiment of the disclosure.
Figure 8:
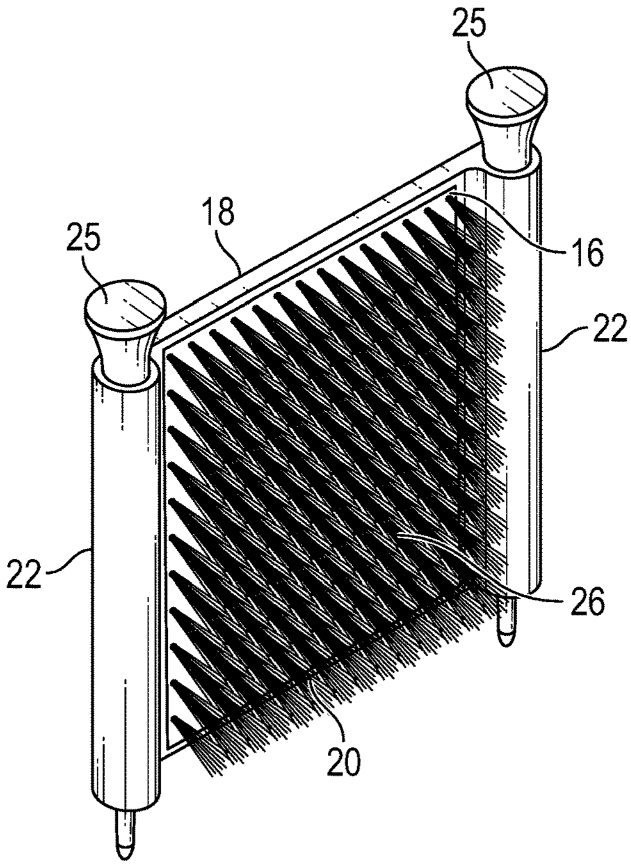
FIG. 8 is a top isometric view of an alternative embodiment of the disclosure.
Figure 9:
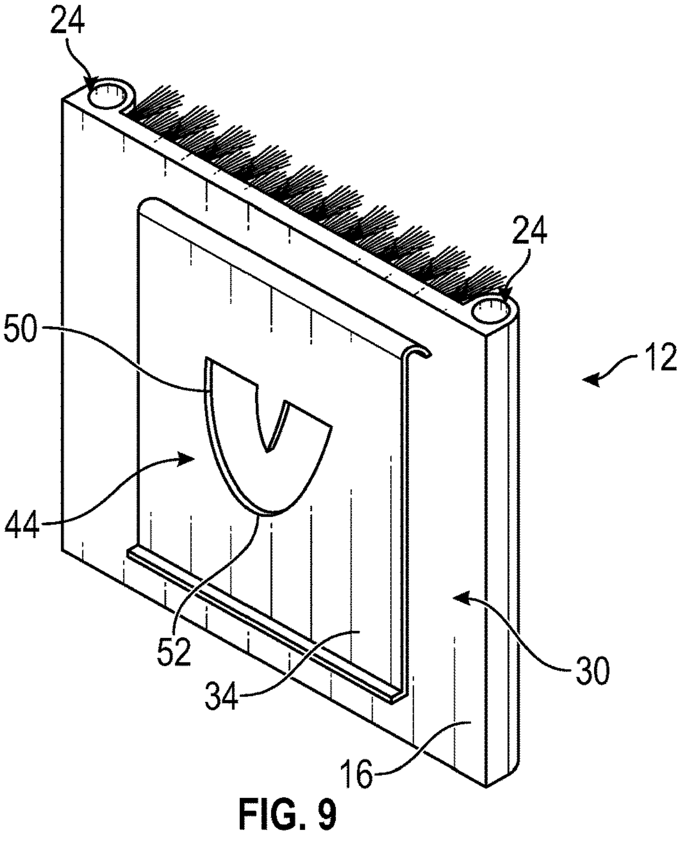
FIG. 9 is a top isometric view of an alternative embodiment of the disclosure.
Figure 10:
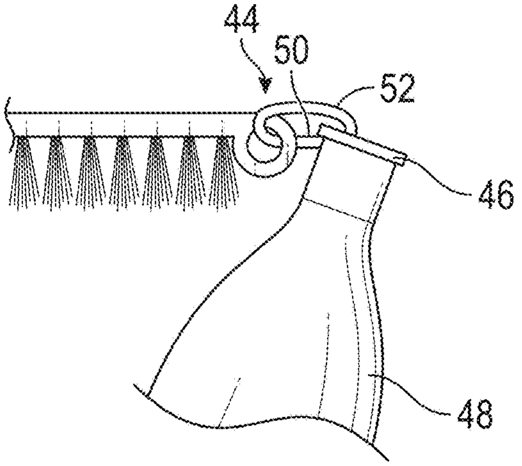
FIG. 10 is an in-use view of an alternative embodiment of the disclosure.
Figure 11:
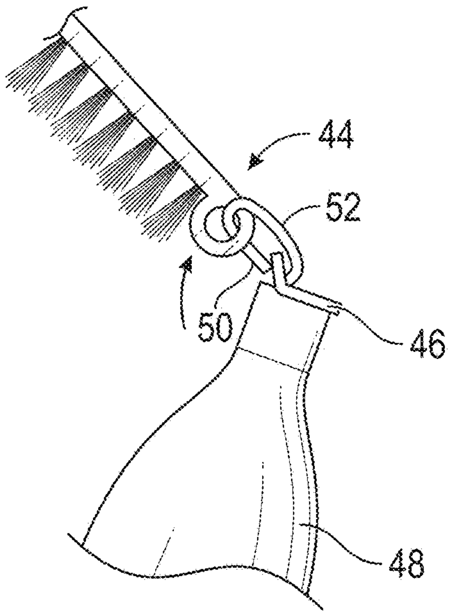
FIG. 11 is an in-use view of an alternative embodiment of the disclosure.
Figure 12:
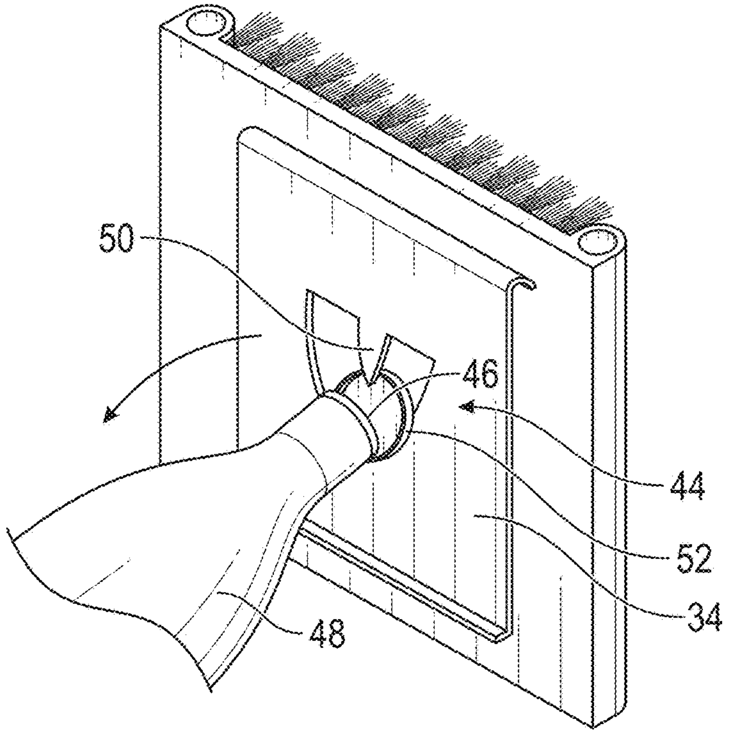
FIG. 12 is an in-use view of an alternative embodiment of the disclosure.

With reference now to the drawings, and in particular to FIGS. 1 through 12 thereof, a new golf tee holder embodying the principles and concepts of an embodiment of the disclosure and generally designated by the reference numeral 10 will be described.

As best illustrated in FIGS. 1 through 12, the multi-functional golfing attachment device 10 generally comprises a base plate 12. The base plate 12 includes a first surface 14, a second surface 16, a first edge 18, a second edge 20, and a pair of lateral edges 22. The first edge 18 and the second edge 20 are parallel to each other, and the first edge 18 is perpendicular to each of the lateral edges 22, wherein the base plate 12 has a square configuration. The base plate 12 has a pair of channels 24 extending therethrough and each of the channels 24 is configured to receive a respective golf tee 25 of a pair of golfing tees 25. One of the channels 24 is adjacent to the first edge 18 and one of the channels 24 is adjacent to the second edge 20. Alternatively, each of the channels 24 may be adjacent to a respective lateral edge 22 of the pair of lateral edges 22.

A plurality of bristles 26 is coupled to the base plate 12 and is configured for facilitating cleaning golf related articles 28 such as a golf club, a golf tee, a golf ball, or any other golf related article 28. The plurality of bristles 26 extends outwardly from the first surface 14 and each of the bristles 26 is bendable. A material of each of the bristles 26 typically is plastic, hair, feather, or any other conventional bristle material.

A fastening member 30 is coupled to the base plate 12 and is configured for removably fastening to an object 32 positioned proximate to a golfer such as a golfing shoe, a golfing bag, or a golfing garment. The fastening member 30 comprises a clip 34 attached to and extending from the second surface 16. A top edge 36 of the clip 34 abuts the base plate 12 and the clip 34 extends therefrom towards a bottom edge 38, wherein the clip 34 is positioned prostrate relative to the second surface 16. The top edge 36 of the clip 34 is positioned proximate to the first edge 18 of the base plate 12, wherein the bottom edge 38 is positioned proximate to the second edge 20 of the base plate 12. The clip 34 is resiliently flexible and may be forcibly spaced from the second surface 16 to facilitate attaching the clip 34 to the object 32. A divot repairing tool 40 is coupled to the base plate 12. The divot repairing tool 40 comprises a pair of tines 42 being positioned on one of the lateral edges 22 and extending outwardly therefrom. An end of each of the tines 42 is pointed, wherein each of the tines 42 is configured to forcibly penetrate into grass on the golf course.

A bottle cap remover 44 is coupled to the base plate 12 and is configured to facilitate removing a cap 46 from a bottle 48. The bottle cap remover 44 comprises a first protrusion and a second protrusion each attached to the second edge 20. The first protrusion is configured for being positioned on a bottom side of the cap, wherein the first protrusion is defined as a lever 50. The second protrusion is configured for being positioned on a top side of the cap, wherein the second protrusion is defined as a fulcrum 52 to the lever 50 such that the lever 50 pivots about the fulcrum 52 when removing the cap 46 from the bottle 48. Alternatively, the clip 34 may have a cutout extending therethrough and forming the fulcrum 52 and the lever 50 to define the bottle cap remover 44 thereon.

In use, the clip 34 may be attached to the golf shoe of the user. Each of the channels 24 may receive a respective golf tee of the pair of golf tees. The plurality of bristles 26 may brush against golf related articles 28 to facilitate cleaning the golf related articles 28. The user may remove the cap 46 from the bottle 48 by engaging the bottle cap remover 44 with the cap and lifting the cap 46 from the bottle 48. The divot repairing tool 40 may be used to repair divots created in the grass by inserting the tines 42 within the grass and rotating the soil upwardly to level the divot with the grass.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multi-functional golfing assist device comprising:
- a base plate, said base plate having a pair of channels extending therethrough, each of said channels being configured to receive a respective golf tee of a pair of golfing tees;
- a plurality of bristles being coupled to said base plate and being configured for facilitating cleaning golf related articles;
- a fastening member being coupled to said base plate and being configured for removably fastening to an object positioned proximate to a golfer;
- a divot repairing tool being coupled to said base plate; and
- a bottle cap remover being coupled to said base plate and being configured to facilitate removing a cap from a bottle.

2. The multi-functional golfing assist device of claim 1, wherein said base plate includes a first surface, a second surface, a first edge, a second edge, and a pair of lateral edges, said first edge and said second edge being parallel to each other, said first edge being perpendicular to each of said lateral edges, said base plate having a square configuration.

3. The multi-functional golfing assist device of claim 2, wherein one of said channels is adjacent to said first edge, one of said channels being adjacent to said second edge.

4. The multi-functional golfing assist device of claim 2, wherein said plurality of bristles extends outwardly from said first surface, each of said bristles being bendable.

5. The multi-functional golfing assist device of claim 2, wherein said fastening member comprises a clip attached to and extending from said second surface, a top edge of said clip abutting said base plate and said clip extending therefrom towards a bottom edge, said clip being resiliently flexible.

6. The multi-functional golfing assist device of claim 2, wherein said divot repairing tool comprises a pair of tines being positioned on one of said lateral edges and extending outwardly therefrom, an end of each of said tines being pointed, wherein each of said tines is configured to forcibly penetrate into grass on the golf course.

7. The multi-functional golfing assist device of claim 2, wherein said bottle cap remover comprises a first protrusion and a second protrusion each being attached to said second edge, said first protrusion being configured for being positioned on a bottom side of the cap, wherein said first protrusion is defined as a lever, said second protrusion being configured for being positioned on a top side of the cap, wherein said second protrusion is defined as a fulcrum to said lever such that said lever pivots about said fulcrum when removing the cap from the bottle.

8. A multi-functional golfing assist device comprising:
- a base plate, said base plate including a first surface, a second surface, a first edge, a second edge, and a pair of lateral edges, said first edge and said second edge being parallel to each other, said first edge being perpendicular to each of said lateral edges, said base plate having a square configuration, said base plate having a pair of channels extending therethrough, each of said channels being configured to receive a respective golf tee of a pair of golfing tees, one of said channels being adjacent to said first edge, one of said channels being adjacent to said second edge;

a plurality of bristles being coupled to said base plate and being configured for facilitating cleaning golf related articles, said plurality of bristles extending outwardly from said first surface, each of said bristles being bendable;

a fastening member being coupled to said base plate and being configured for removably fastening to an object positioned proximate to a golfer, said fastening member comprising a clip attached to and extending from said second surface, a top edge of said clip abutting said base plate and said clip extending therefrom towards a bottom edge, said clip being resiliently flexible;

a divot repairing tool being coupled to said base plate, said divot repairing tool comprising a pair of tines being positioned on one of said lateral edges and extending outwardly therefrom, an end of each of said tines being pointed, wherein each of said tines is configured to forcibly penetrate into grass on the golf course; and a bottle cap remover being coupled to said base plate and being configured to facilitate removing a cap from a bottle, said bottle cap remover comprising a first protrusion and a second protrusion each being attached to said second edge, said first protrusion being configured for being positioned on a bottom side of the cap, wherein said first protrusion is defined as a lever, said second protrusion being configured for being positioned on a top side of the cap, wherein said second protrusion is defined as a fulcrum to said lever such that said lever pivots about said fulcrum when removing the cap from the bottle.

* * * * *